US011122592B2

(12) United States Patent
Damnjanovic et al.

(10) Patent No.: US 11,122,592 B2
(45) Date of Patent: Sep. 14, 2021

(54) 5G NEW RADIO WITH SHARING BETWEEN PRIORITY ACCESS LICENSE AND GENERAL AUTHORIZED ACCESS COMMUNICATIONS

(71) Applicant: QUALCOMM Incorporated, San Diego, CA (US)

(72) Inventors: Aleksandar Damnjanovic, Del Mar, CA (US); Arumugam Chendamarai Kannan, San Diego, CA (US); Yisheng Xue, San Diego, CA (US); Xiaoxia Zhang, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 16/445,001

(22) Filed: Jun. 18, 2019

(65) Prior Publication Data

US 2019/0394790 A1    Dec. 26, 2019

Related U.S. Application Data

(60) Provisional application No. 62/687,510, filed on Jun. 20, 2018.

(51) Int. Cl.
*H04W 72/12*     (2009.01)
*H04W 52/28*     (2009.01)
(Continued)

(52) U.S. Cl.
CPC ..... *H04W 72/1247* (2013.01); *H04W 52/281* (2013.01); *H04W 72/0446* (2013.01);
(Continued)

(58) Field of Classification Search
CPC ........... H04W 72/1247; H04W 52/281; H04W 72/0446; H04W 72/10; H04W 72/1294; H04W 74/085
See application file for complete search history.

(56) References Cited

U.S. PATENT DOCUMENTS

2017/0222776 A1    8/2017  Dinan
2017/0331606 A1*  11/2017  Chen ..................... H04W 76/27
(Continued)

FOREIGN PATENT DOCUMENTS

WO    WO-2017125009 A1    7/2017

OTHER PUBLICATIONS

International Search Report and Written Opinion—PCT/US2019/038020—ISA/EPO—dated Sep. 9, 2019.
(Continued)

*Primary Examiner* — Eric Myers
(74) *Attorney, Agent, or Firm* — Liem T. Do

(57) ABSTRACT

Sharing between priority access license (PAL) and general authorized access (GAA) communications in 5G new radio (NR) systems in 3.5 GHz Spectrum Access System (SAS)/License Shared Access (LSA) operations is disclosed. A resource configuration may be defined that identifies a plurality of sound reference signal (SRS) resources including at least a sounding set of SRS resources and a coexistence set of SRS resources. When communication may occur between PAL entities, a base station transmits a trigger signal to a served UE. The UP transmits an SRS in response to the trigger signal using the coexistence set of SRS resources. The SRS over the coexistence set of resources may reserve communication on the shared communication channel.

14 Claims, 13 Drawing Sheets

(51) Int. Cl.
  *H04W 72/04*  (2009.01)
  *H04W 72/10*  (2009.01)
  *H04W 74/08*  (2009.01)
(52) U.S. Cl.
  CPC ....... *H04W 72/10* (2013.01); *H04W 72/1294* (2013.01); *H04W 74/085* (2013.01)

(56) References Cited

U.S. PATENT DOCUMENTS

2018/0167848 A1  6/2018  Lei et al.
2019/0132103 A1  5/2019  Yang et al.

OTHER PUBLICATIONS

Samsung: "Discussion on LBT for Self-carrier Scheduling," 3GPP TSG RAN WG1 Meeting #84bis, 3GPP Draft; R1-162671, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016, Apr. 2, 2016, XP051080338, 5 pages, Retrieved from the Internet: URL: http://www.3gpp.org/ftp/tsg_ran/WG1_RL1/TSGR1_84b/Docs/ [retrieved on Apr. 2, 2016].

\* cited by examiner

5G NEW RADIO WITH SHARING BETWEEN PRIORITY ACCESS LICENSE AND GENERAL AUTHORIZED ACCESS COMMUNICATIONS

CROSS-REFERENCE TO RELATED APPLICATIONS

This application claims the benefit of U.S. Provisional Patent Application No. 62/687,510, entitled, "5G NR IN 3.5 GHZ WITH SHARING BETWEEN PAL AND GAA COMMUNICATIONS," filed on Jun. 20, 2018, which is expressly incorporated by reference herein in its entirety.

BACKGROUND

Field

Aspects of the present disclosure relate generally to wireless communication systems, and more particularly, to 5G new radio (NR) systems sharing between priority access license (PAL) and general authorized access (GAA) communications.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

With the increased demand for mobile broadband access, additional spectrum has been opened for shared communications at frequencies previously restricted for exclusive licensed, governmental, or military use. In one example of such additional spectrum, the citizens broadband radio service (CBRS) spectrum around 3.5 GHz has been opened for shared access according to new, hierarchical access rights and procedures. This shared scheme may be referred to as Spectrum Access System (SAS) or License Shared Access (LSA). Further procedures and advancement may be directed to enhancing mobile communications using such shared spectrum.

SUMMARY

In one aspect of the disclosure, a method of wireless communication includes obtaining, by a UE, a resource configuration, wherein the resource configuration identifies a plurality of sound reference signal (SRS) resources including at least a sounding set of SRS resources and a coexistence set of SRS resources, receiving, by the UE, a trigger signal from a serving base station over a shared spectrum shared between at least one or more priority license users, transmitting, by the UE in response to the trigger signal, an SRS using the coexistence set of SRS resources, and communicating, by the UE, with the serving base station.

In an additional aspect of the disclosure, a method of wireless communication includes determining, by a base station, a communication operation between the base station and one or more served. UEs, monitoring, by the base station, for radio frequency (RF) energy on a communication channel at a beginning of a listen before talk (LBT) window of a current frame in a shared spectrum shared between at least one or more opportunistic general authorized users, wherein the monitoring occurs after a back-off operation executed by the base station, transmitting, by the base station, an LBT trigger signal in response to detection of no RF energy above a minimum energy threshold at the beginning of the LBT window, receiving, by the base station, an LBT trigger response signal from the one or more served UEs, wherein the RF energy on the communication channel remains above the minimum energy threshold for a remainder of the LBT window, and communicating, by the base station, with the one or more UEs during a channel occupancy time (COT) of the current frame after the LBT window.

In an additional aspect of the disclosure, an apparatus configured for wireless communication includes means for obtaining, by a UE, a resource configuration, wherein the resource configuration identifies a plurality of SRS resources including at least a sounding set of SRS resources and a coexistence set of SRS resources, means for receiving, by the UE, a trigger signal from a serving base station over a shared spectrum shared between at least one or more priority license users, means for transmitting, by the UE in response to the trigger signal, an SRS using the coexistence set of SRS resources, and means for communicating, by the UE, with the serving base station.

In an additional aspect of the disclosure, an apparatus configured for wireless communication includes means for determining, by a base station, a communication operation between the base station and one or more served. UEs, means for monitoring, by the base station, for RF energy on a communication channel at a beginning of a LBT window of a current frame in a shared spectrum shared between at least one or more opportunistic general authorized users, wherein the means for monitoring occurs after a back-off operation executed by the base station, means for transmitting, by the base station, an LBT trigger signal in response to detection of no RF energy above a minimum energy threshold at the beginning of the LBT window, means for receiving, by the base station, an LBT trigger response signal from the one or more served UEs, wherein the RF energy on the communication channel remains above the minimum energy threshold for a remainder of the LBT window, and means for communicating, by the base station, with the one or more UEs during a COT of the current frame after the LBT window.

In an additional aspect of the disclosure, a non-transitory computer-readable medium having program code recorded thereon. The program code further includes code to obtain, by a UE, a resource configuration, wherein the resource configuration identifies a plurality of SRS resources including at least a sounding set of SRS resources and a coexistence set of SRS resources, code to receive, by the UE, a trigger signal from a serving base station over a shared spectrum shared between at least one or more priority license users, code to transmit, by the UE in response to the trigger signal, an SRS using the coexistence set of SRS resources, and code to communicate, by the UE, with the serving base station.

In an additional aspect of the disclosure, a non-transitory, computer-readable medium having program code recorded thereon. The program code further includes code to determine, by a base station, a communication operation between the base station and one or more served UEs, code to monitor, by the base station, for RF energy on a communication channel at a beginning of a LBT window of a current frame in a shared spectrum shared between at least one or more opportunistic general authorized users, wherein the code to monitor is executed after a back-off operation executed by the base station, code to transmit, by the base station, an LBT trigger signal in response to detection of no RF energy above a minimum energy threshold at the beginning of the LBT window, code to receive, by the base station, an LBT trigger response signal from the one or more served UEs, wherein the RF energy on the communication channel remains above the minimum energy threshold for a remainder of the LBT window, and code to communicate, by the base station, with the one or more UEs during a COT of the current frame after the LBT window.

In an additional aspect of the disclosure, an apparatus configured for wireless communication is disclosed. The apparatus includes at least one processor, and a memory coupled to the processor. The processor is configured to obtain, by a UE, a resource configuration, wherein the resource configuration identifies a plurality of SRS resources including at least a sounding set of SRS resources and a coexistence set of SRS resources, to receive, by the UE, a trigger signal from a serving base station over a shared spectrum shared between at least one or more priority license users, to transmit, by the UE in response to the trigger signal, an SRS using the coexistence set of SRS resources, and to communicate, by the UE, with the serving base station.

In an additional aspect of the disclosure, an apparatus configured for wireless communication is disclosed. The apparatus includes at least one processor, and a memory coupled to the processor. The processor is configured to determine, by a base station, a communication operation between the base station and one or more served UEs, to monitor, by the base station, for RF energy on a communication channel at a beginning of a LBT window of a current frame in a shared spectrum shared between at least one or more opportunistic general authorized users, wherein the configuration to monitor is executed after a back-off operation executed by the base station, to transmit, by the base station, an LBT trigger signal in response to detection of no RF energy above a minimum energy threshold at the beginning of the LBT window, to receive, by the base station, an LBT trigger response signal from the one or more served UEs, wherein the RF energy on the communication channel remains above the minimum energy threshold for a remainder of the LBT window, and to communicate, by the base station, with the one or more UEs during a COT of the current frame after the LBT window.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
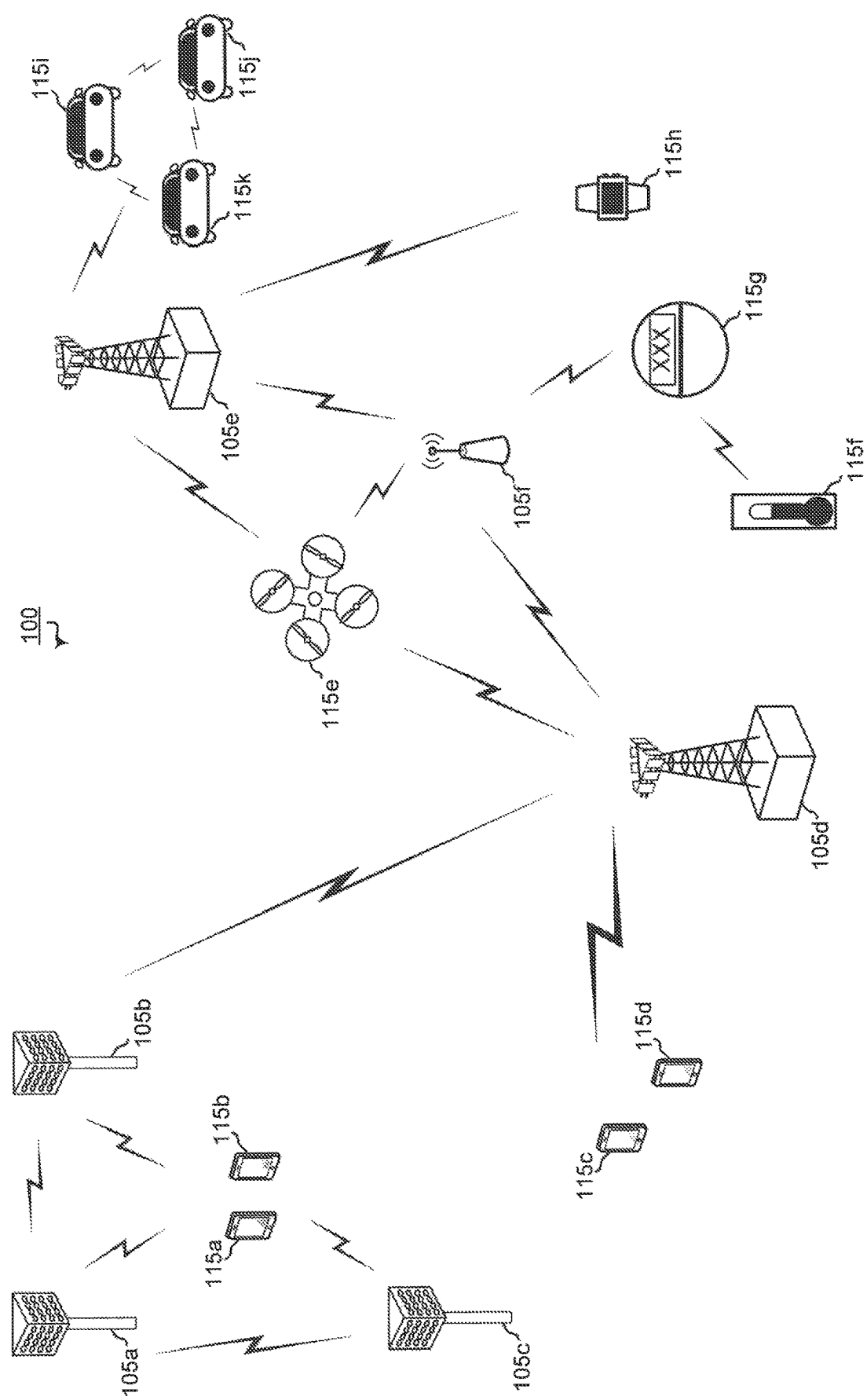
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 1.0, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability. While longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO, Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
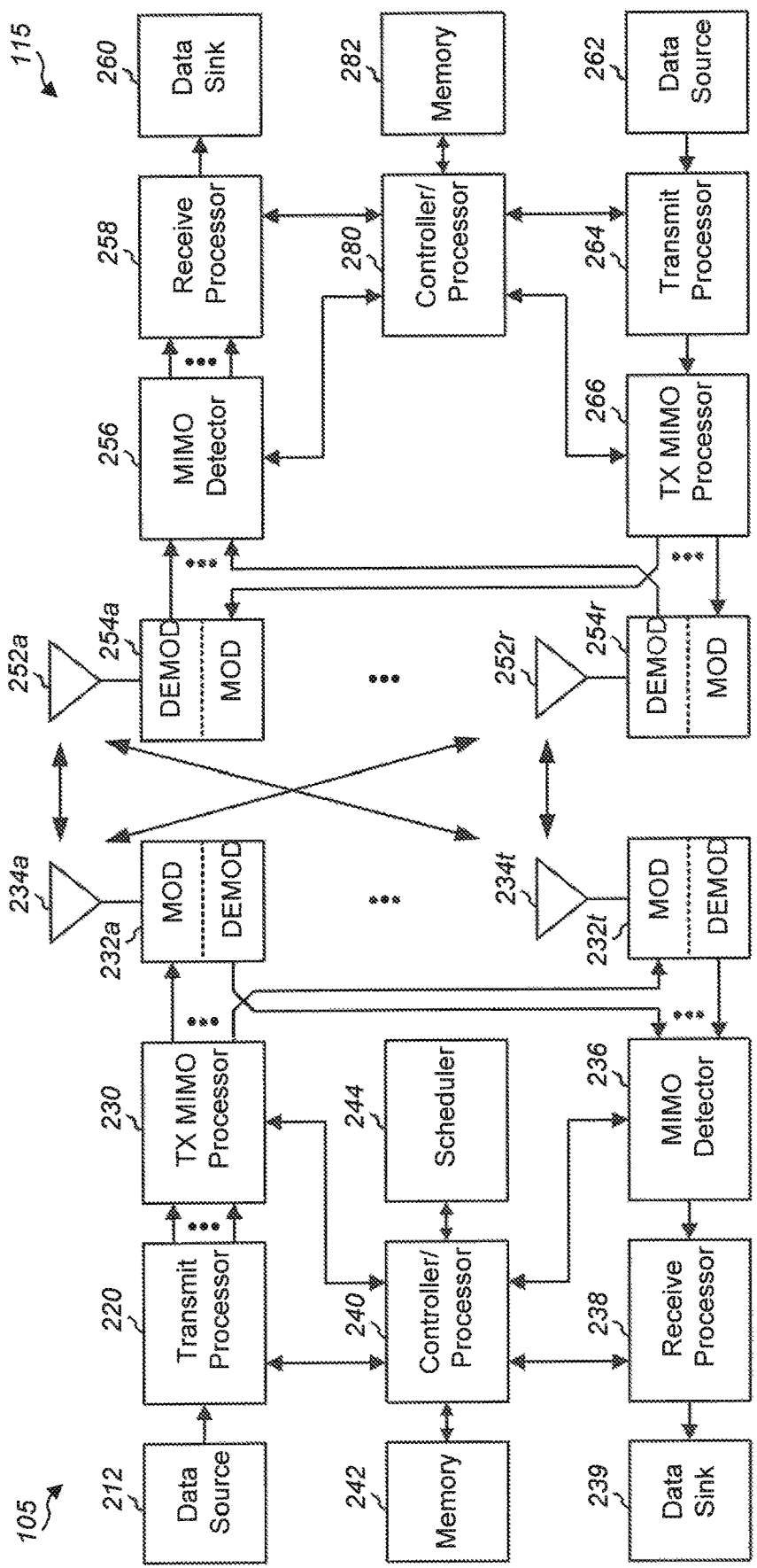
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PDSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MEMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
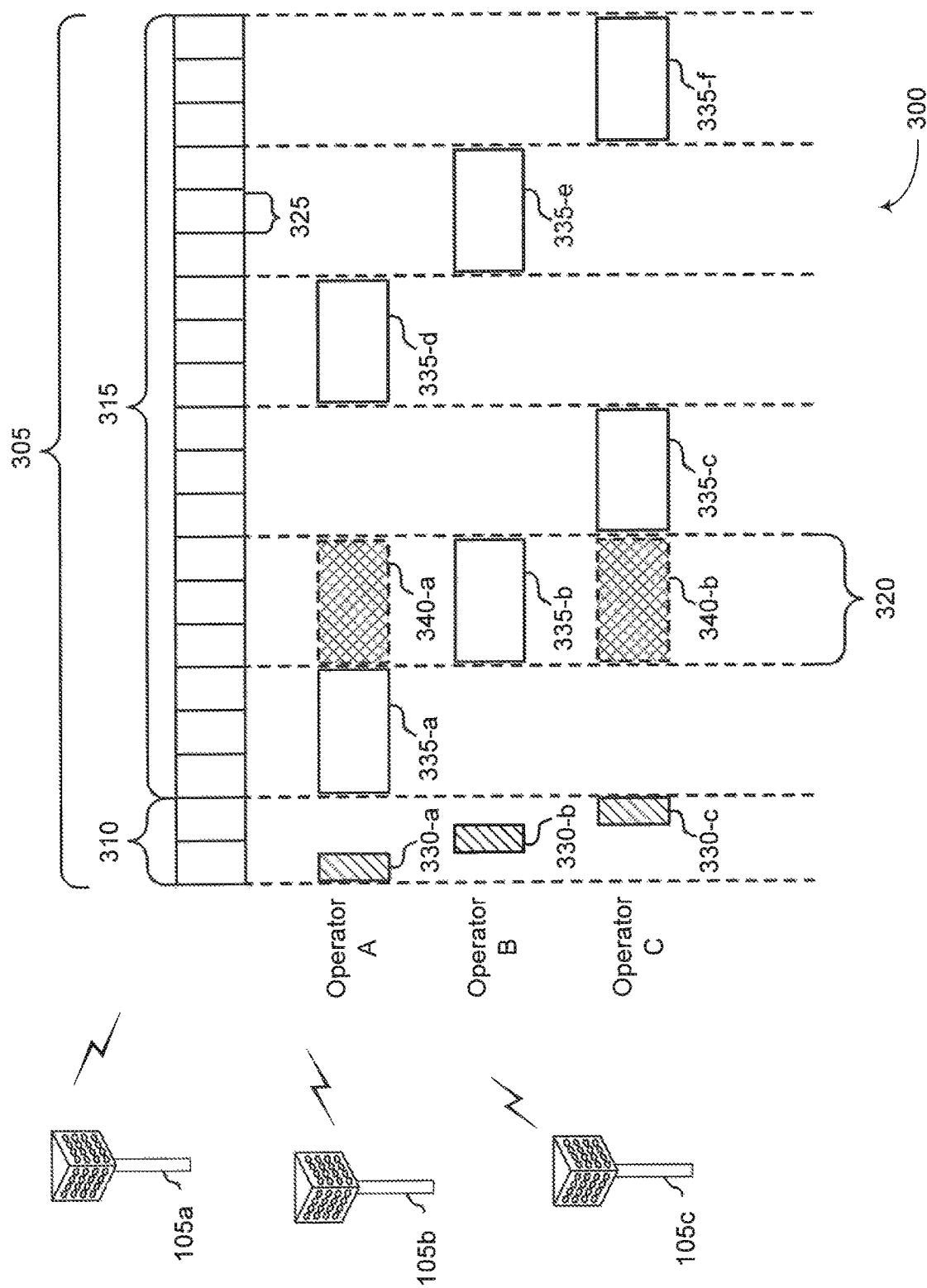
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g. UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* may be prioritized for Operator C (e.g., G-INT-OpC), resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent on O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LIST or similar method that a higher priority operating entity is not going to use its (g-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT throne of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Within the spectrum sharing of the CBRS or 3.5 GHz spectrum, there may be three levels of priority defined for accessing the spectrum. Ultimate priority for accessing the spectrum lies with the incumbent users, such as governmental entities, U.S. naval radar systems, Department of Defense, fixed satellite systems (FSS), radio location services (e.g., aeronautical radio navigation systems (ARNS), etc.), site-specific protections for registered sites, and the like. When opening this spectrum to shared use, a portion of the spectrum was designated for sharing with the incumbent users. After incumbent users, priority access licenses (PALS) users, which typically pay a fee to reserve a portion of the spectrum in a particular geographic location and for a limited period of time have a next highest priority. The lowest priority users are referred to as general authorized access (GAA) users, which operate on opportunistic access principles. Thus, if neither incumbent nor PAL users are occupying available spectrum, GAA users may attempt access of the shared spectrum.

Within the segment of PAL users, the principles of spectrum sharing provide for both exclusive or guaranteed resources and shared resources. The exclusive or guaranteed resources are reserved for critical overhead signals and channels. Allocation of such exclusive resources may be coordinated through spectrum allocation servers, which manage access rights to the CBRS or 3.5 GHz spectrum. PAL users may use such guaranteed resources for transmission of synchronization signal blocks (SSBs), system information (SI), paging signals, random access resources (physical random access channel (PRACH)) and the like. Because there may usually be a small number of operators sharing the spectrum band at any given geographical location, a relatively small overhead may be needed to manage sharing the spectrum.

Allocation and access to the guaranteed resources may be coordinated in both the time and frequency domains. The guaranteed resources may also be used as a part of different modes of operation due to flexible configurations for these resources in NR. Such guaranteed resources could also be used for critical quality of service (QoS) applications. For example, each licensee may be assigned resources that are not shared and that can be used for critical QoS services, such as ultra-reliable, low latency communications (URLLC), as well as hybrid automatic repeat request (HARQ) and channel state information (CSI) feedback.

In addition to the guaranteed resources, each PAL user may also access shared resources of the spectrum. Each such PAL user may be assigned priority access in different slots or frames of the shared resources. Thus, in the context of sharing between PAL users, for each slot or frame, there may be assigned priority PAL users and non-assigned priority PAL users. The shared resources can be used by the non-assigned priority PAL user when the assigned priority PAL user does not access the resource during its priority slot/frame. The determination of access to the shared resources occurs through a reservation procedure. The non-assigned priority users may create interference to the assigned priority users if the reservation procedure fails. In fact, the non-assigned priority users may block the medium from the assigned priority users until the channel occupancy time (COT) boundary.

Figure 4:
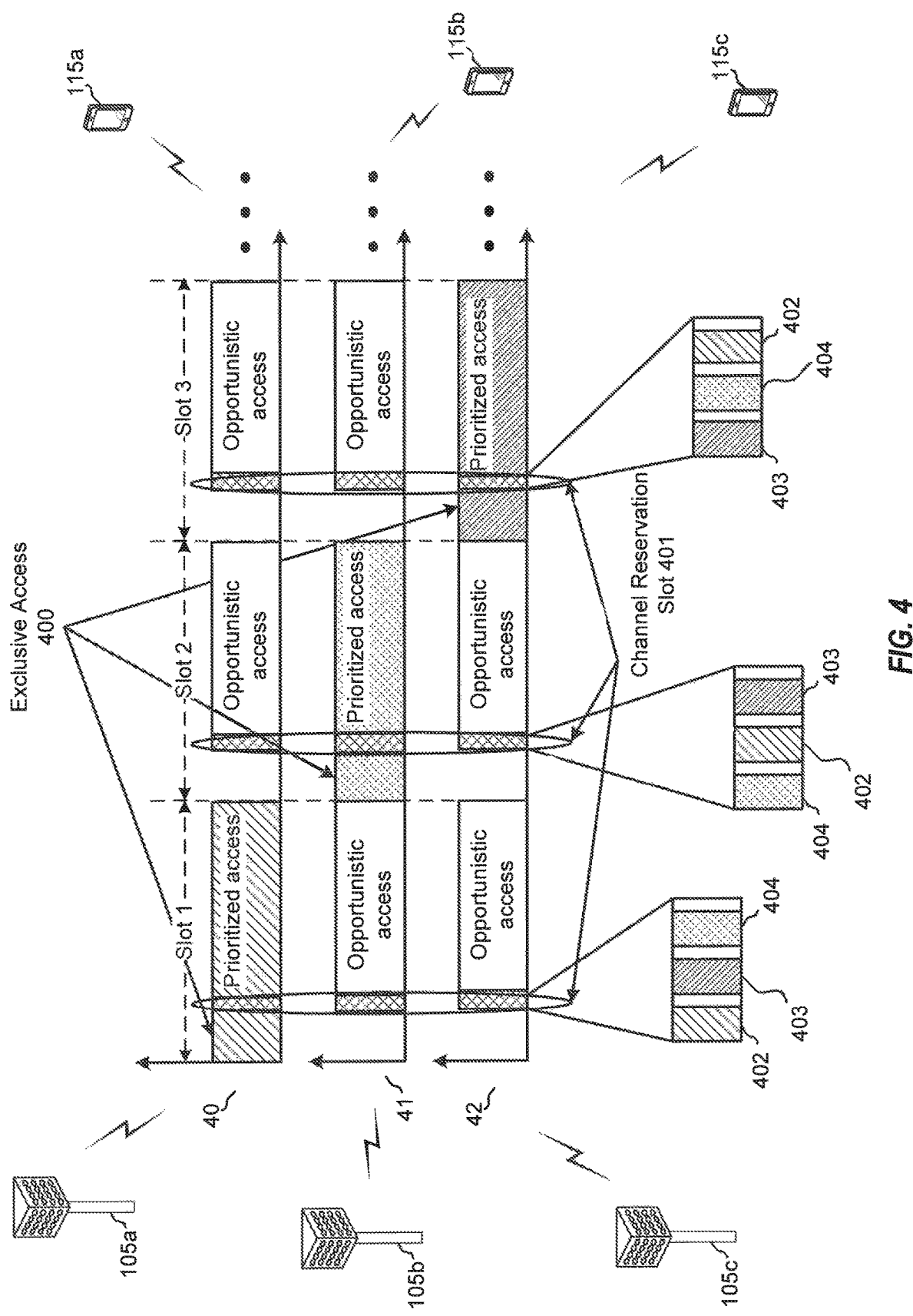
FIG. 4 is a block diagram illustrating shared communications over CBRS spectrum between PAL users.

FIG. 4 is a block diagram illustrating shared communications over CBRS spectrum between PAL users, base stations 105a-105c and UEs 115a-115c. The illustration of communication streams 40-42 visually depict the streams as separate resources. However, this visual depiction is for clarity. Each of communication streams 40-42 is the communication stream as seen by each of the communication pairs of the same frequency resources. Thus, communication stream 40 represents the shared frequency resources as seen by base station 105a and UE 115a, communication stream 41 represents the same shared frequency resources as seen by base station 105b and UE 115b, and communication stream 42 represents the same shared frequency resources as seen by base station 105b and UE 115b. Each of the base stations 105a-105c provide communications for different operators.

In a frame based equipment (FEE)-like procedure, the shared resources are organized into a synchronized slotted structure. The shared access server will assign each operator exclusive resources 400 in time. A channel reservation slot 401 is provided in each slot or frame. Base stations 105a-105b transmit a reservation signal according to a medium reservation order within channel reservation slot 401 (e.g., base station 105a transmits reservation signal 402, base station 105b transmits reservation signal 403, and base station 105c transmits reservation signal 404). The medium reservation order within channel reservation slot 401 determines priority access. For example, in slot 1, operator 1 has priority access. Therefore, base station 105a may use exclusive resources 400 for control or data signals and has assigned priority to the shared spectrum of slot 1 for communications with UE 115a. Similarly, operator 2 (base station 105b) has priority access to slot 2 and may use exclusive resources 400 of slot 2 and has assigned priority to the shared spectrum of slot 2 for communications with UE 115b. Operator 3 (base station 105c) has priority access to slot 3 and may use exclusive resources 400 of slot 3 and has assigned priority to the shared spectrum of slot 3 for communications with UE 115c.

Within channel reservation slot 401 of each of slots 1-3, the medium reservation order will determine which operator has priority access to the shared resources of the slot. Therefore, within channel reservation slot 401 of slot 1, base station 105a transmits reservation signal 402 in the first position. Base stations 105b and 105c (of operators 2 and 3, respectively) are listening for reservation signal 402 to identify whether the assigned priority user will be accessing the shared resources. If undetected, base station 105b would transmit reservation signal 403 to reserve the shared resources. Base station 105c, which is assigned the last position of the medium reservation order, further listens for reservation signal 403. If undetected, base station 105c will transmit reservation signal 404. During the assigned priority slot of one operator, the other operators may have opportunistic access to the shared resources if the assigned priority user does not reserve access to the slot.

Existing NR signals and channels may be leveraged for use in the reservation procedure. For example, a base station transmission of a downlink control information. (DCI) with either configured demodulation reference signal (DMRS) or channel state information reference signal (CSI-RS) can be used to reserve the shared resources for the protection of the receiver. UE transmission of sounding reference signals (SRS), triggered by the base station, can additionally be used to provide protection of the UEs to be scheduled. In one example aspect, the base stations would monitor for the reservation signals from other operators. In such aspects, the secondary (non-assigned) priority operators would be allowed to use the shared resources for downlink traffic.

In various aspects of the present disclosure, neighboring base stations that belong to different operators would monitor for each other's broadcast medium reservation signal (e.g., DMRS, CSI-RS, etc.). Where the medium reservation signal takes the form of a broadcast DMRS, the DMRS sequences and resources would be agreed upon for designation of medium reservation. DMRS is typically transmitted in symbol 0, which may provide more time for processing and scheduling for the secondary operator(s). Alternatively, where CSI-RS is used for the medium reservation signal, less time may be available for processing at the receiving base stations. However, CSI-RS based measurement configuration can be reused, in which the measurements may be performed by neighboring base stations instead of UEs. When operating in the 3.5 GHz spectrum, the measurement configuration may be exchanged through a CBRS shared access server, instead of over the air signaling when the base station configures the UE. Moreover, while there may be no filtering, the presence and strength of the signal may be determined in a single short detection operation.

On the UE signaling, a base station may monitor for the SRS from the UEs served by base stations of other operators.

SRS configurations may be exchanged among the different operators through a CBRS shared access server. According to aspects of the present disclosure, multiple SRS resources can be configured, such that at a first, UE-specific SRS resource set may be configured for regular sounding operation, and, at least, a second SRS resource set may be configured for coexistence signaling. Additionally, each SRS resource set can be separately power controlled and configured using separate power control reference signaling. SRS can be transmitted at full power or may be power controlled to specifically target a neighboring base station. SRS transmitted according to the various aspects herein may be triggered in advance, such that SRS from UEs belonging to an assigned priority operator that require protection can be transmitted within the reservation slot. Thus, according to the aspects of the present disclosure, a sharing technique is provided for sharing of spectrum between multiple networks in which certain networks have priority over others.

It should be noted that, while some example aspects may be discussed with respect to the 3.5 GHz spectrum, the various aspects of the present disclosure are not limited to a single use case. The general sharing techniques provided herein may be applicable to any spectrum sharing scenario where one network has a higher priority than another.

Figure 5:
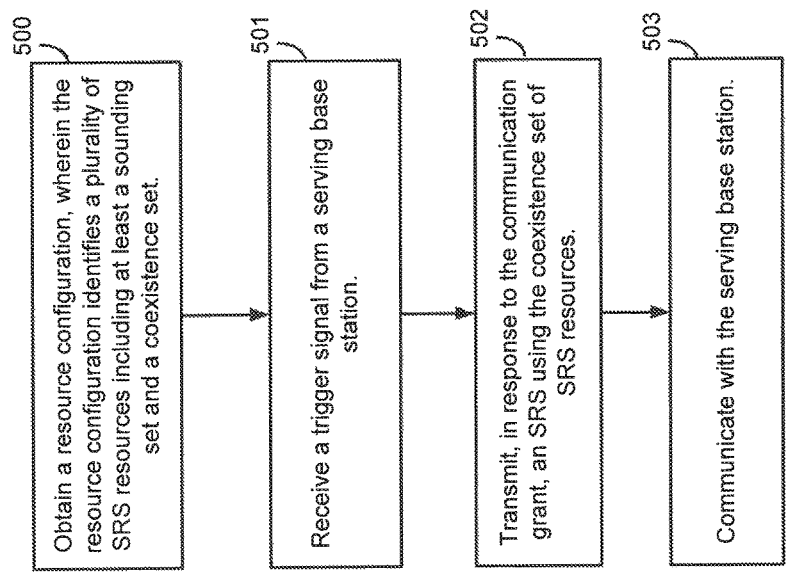
FIG. 5 is a block diagram illustrating example blocks executed to implement one aspect of the present disclosure.
Figure 12:
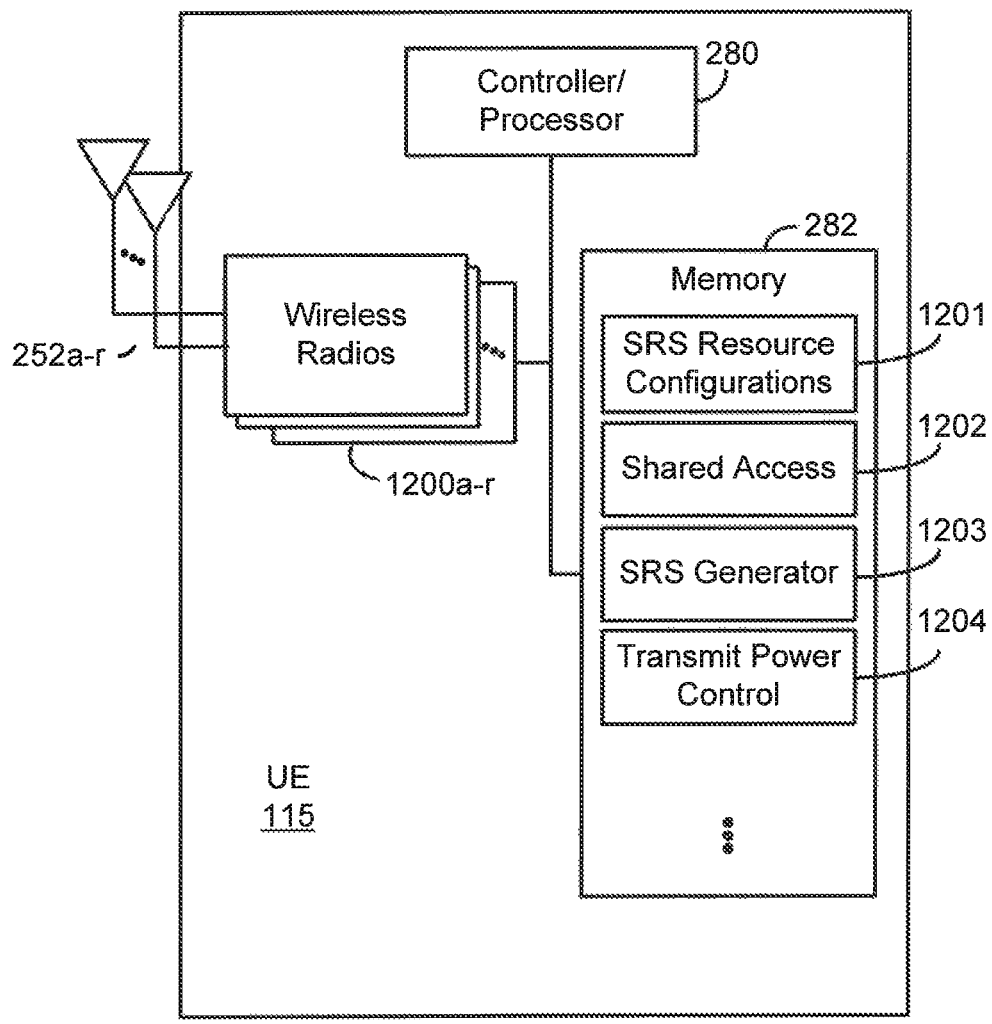
FIG. 12 is a block diagram illustrating a UE configured according to one aspect of the present disclosure.

FIG. 5 is a block diagram illustrating example blocks executed to implement one aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r, Wireless radios 1200a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE obtains a resource configuration, wherein the resource configuration identifies a plurality of SRS resources including at least a sounding set of SRS resources and a coexistence set of SRS resources. According to aspects of the present disclosure, the different SRS resource sets are associated with the function they serve. Thus, the resources assigned to the coexistence set may be known to other nodes as being associated with a channel reservation signal. For example, a UE, such as UE 115, obtains a resource configuration, which may be obtained via a transmission received from a serving base station over antennas 252a-r and wireless radios 1200a-r and stored, in memory 282, at SRS resource configurations 1201, or pre-existing at SRS resource configurations 1201 from the manufacturer. The different configurations within SRS resource configurations 1201 may identify many different types of SRS and their associated resources, such as normal sounding signal SRS or coexistence SRS for reserving access to a shared communication channel.

At block 501, the UE receives a trigger signal from a serving base station in communication with the UE over a shared spectrum shared between at least one or more priority license users. For example, UE 115, may receive the trigger signal via antennas 252a-r and wireless radios 1200a-r. The trigger signal identifies to UE 115, under control of controller/processor 280, to initiate actions to compete for the shared spectrum. UE 115 may therefore execute shared access logic 1202, stored in memory 282. The execution environment of shared access logic 1202 provides for UE 115 to begin reservation of the shared channel. In one example implementation, the trigger signal may be a communication grant, such as a downlink grant for downlink transmissions or an uplink grant to schedule and allocate resources for uplink transmissions, or both. The trigger signal may also be implemented as a dedicated signal for triggering the coexistence operation.

At block 502, the UE transmits, in response to the trigger signal, an SRS signal using the coexistence set of SRS resources. The trigger signal triggers UE 115 to begin coexistence operations, such as by transmitting a channel reservation signal. Thus, within the execution environment of shared access logic 1202, UE 115 executes SRS generator 1203, in memory 282, in response to the trigger signal. Because the trigger signal triggers the shared access operations, UE 115, under control of controller/processor 280, uses the configured resources in SRS configuration resources 1201 to generate a coexistence SRS as a channel reservation signal. The channel reservation signal according to the aspects of the present disclosure are implemented using the SRS signaling with the coexistence set of SRS resources. UE 115 may then transmit the coexistence SRS generated by SRS generator 1203 via wireless radios 1200a-r and antennas 252a-r.

At block 503, the UE communicates with the serving base station. After transmitting the channel reservation SRS signals using the coexistence set of SRS resources, communications may proceed, whether granted through the trigger signal or granted in a separate transmission grant for either uplink communication, downlink communication, or both in the COT portion of the current frame. UE 115 may then communicate with the serving base station either through uplink or downlink transmissions via wireless radios 1200a-r and antennas 252a-r.

Figure 6:
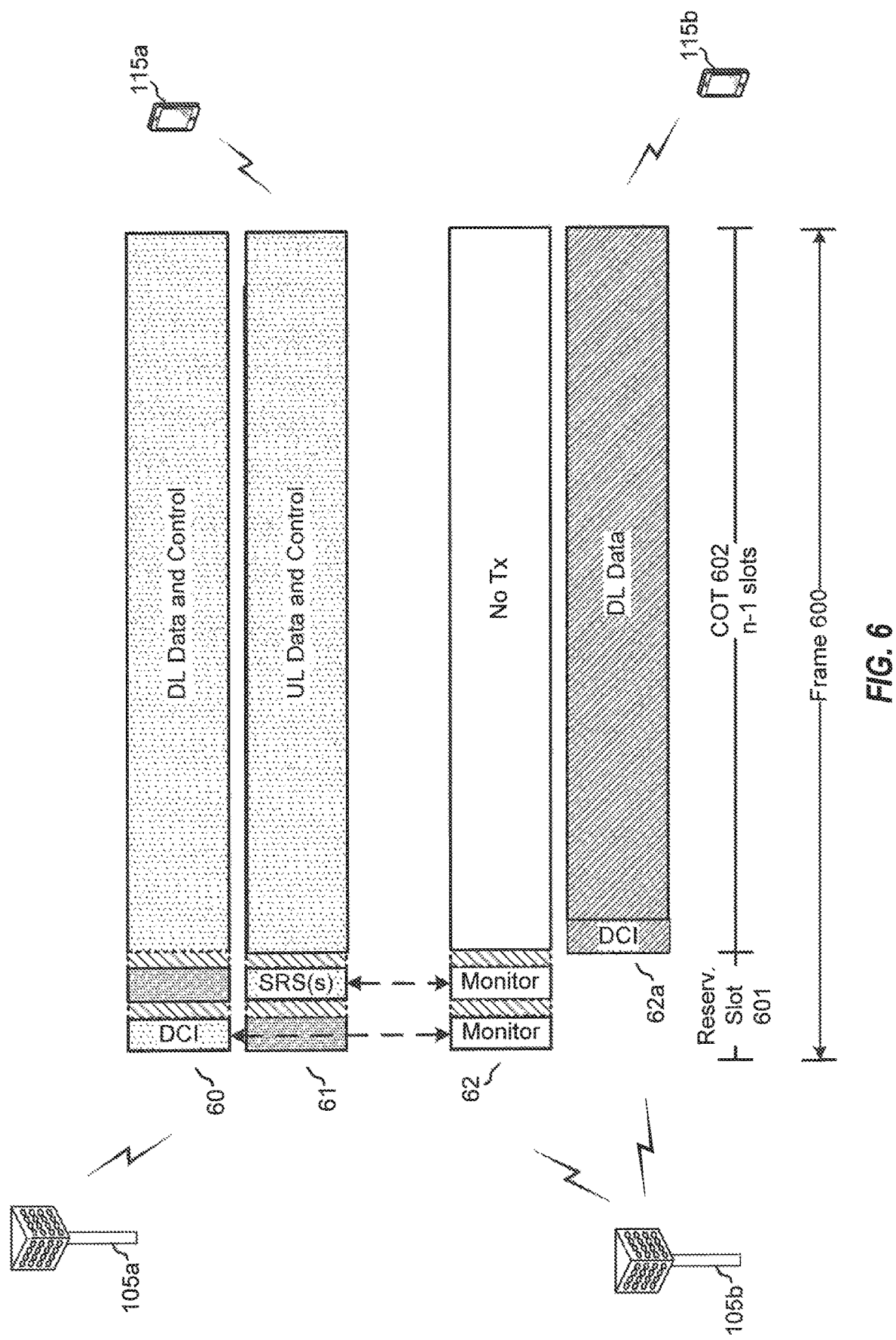
FIG. 6 is a block diagram illustrating shared communication between network entities of two PAL operators, the network entities configured according to one aspect of the present disclosure.

FIG. 6 is a block diagram illustrating shared communication between network entities of two PAL operators, the network entities, base stations 105a-105b and UEs 115a-115b, configured according to one aspect of the present disclosure. Communication streams 60-62a represent communications over the same shared frequency band between base stations 105a-105b and UEs 115a-115b, respectively. Base station 105a and UE 115a communicate via a first operator (Operator 1), which is assigned priority access to the shared frequency band during frame 600. Base station 105b and UE 115b communicate via a second operator (Operator 2), which is the non-assigned priority operator for the shared frequency band in frame 600. Communication stream 60 is the communication as transmitted from base station 105a, while communication stream 61 is the communication as transmitted from UE 115a. Communication streams 62 is the communication as transmitted from base station 105b, while communication stream 62a is an alternative communication as transmitted from base station 105b.

Access to the shared frequency band is governed by priority-based access between Operators 1 and 2, with Operator 1 having priority during frame 600. When there is data to communicate between base station 105a and UE 115a, whether downlink data, uplink data, or both, base station 105a transmits a reservation signal (e.g., DCI of either DMRS or CSI-RS, etc.) during reservation slot 601. UE 115a may respond with its reservation signal SRS using the coexistence SRS resources set. Base station 105b, of Operator 2, monitors the shared frequency band during reservation slot 601 for any reservation signals from Operator 1 entities. If base station 105b detects either the reservation signal DCI from base station 105a or the coexistence SRS transmitted by UE 115a, it will refrain from transmission during COT 602 of frame 600, as illustrated in communication stream 62. Otherwise, if base station 105b does not detect either the reservation signal DCI from base station 105a or the coexistence SRS transmitted by UE 115a, it may transmit downlink data after transmitting its own DCI during COT 602 of frame 600, as illustrated in alternative communication stream 62a.

In order to guarantee no interference to Operator 1, any HARQ/CSI feedback from UE 115b can be delayed and transmitted on guaranteed resources, such as exclusive resources 400 (FIG. 4). UE 115b may delay HARQ feedback though receipt of DCI signaling of different kI values. The transmitted kI values may provide for all HARQ feedback to be transmitted in the last slot. Alternatively, the HARQ feedback may also be delayed to the next reservation slot, since DMRS or CSI-RS and SRS are utilized for coexistence in the reservation slots.

Figure 7:
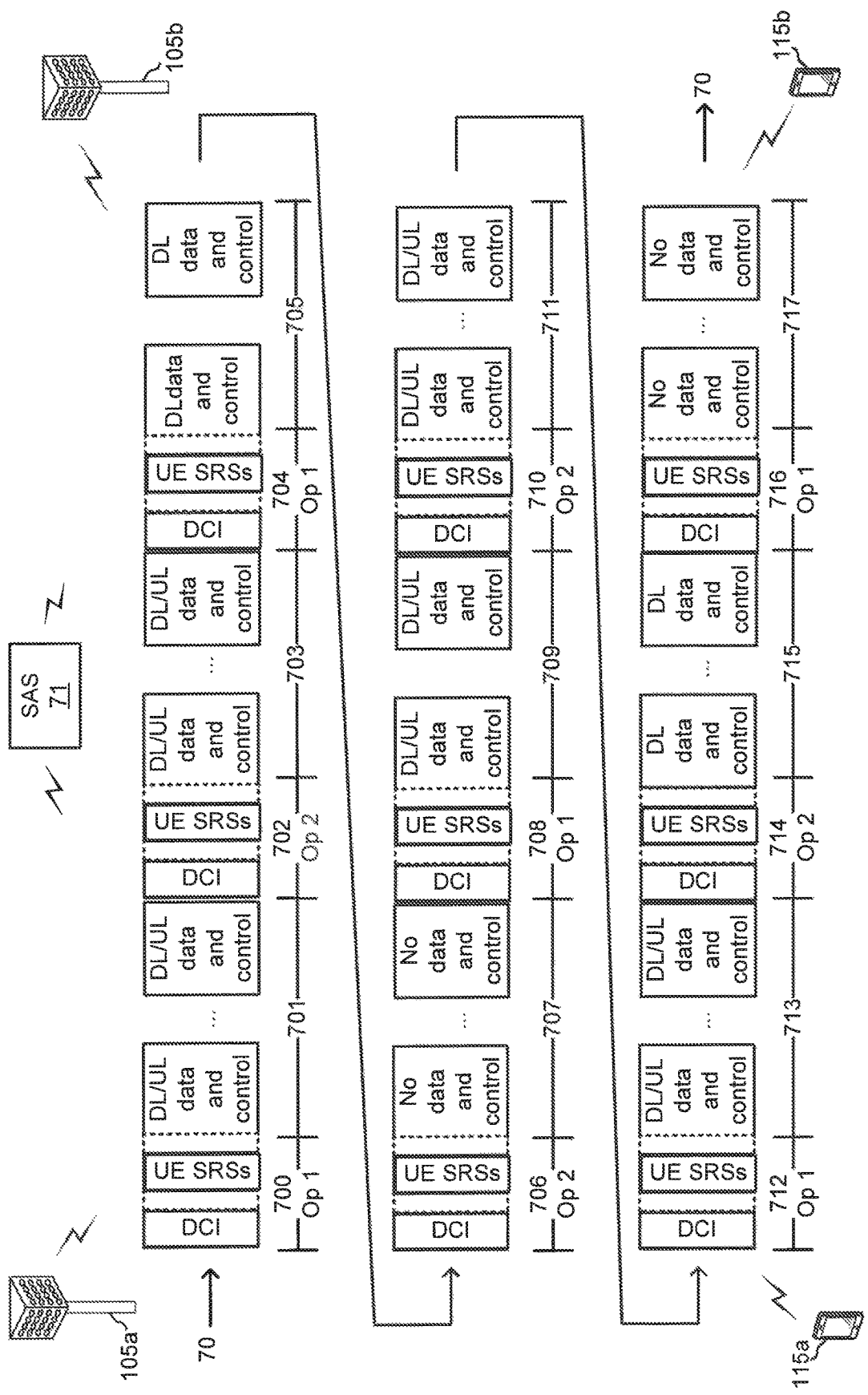
FIG. 7 is a block diagram illustrating time division multiplex (TDM) sharing of shared frequency band by base stations and UEs, operated by two different operators, respectively, and each configured according to one aspect of the present disclosure.

FIG. 7 is a block diagram illustrating time division multiplex (TDM) sharing of shared frequency band 70 by base stations 105a-105b and UEs 115a-115b, operated by two different operators, respectively, and each configured according to one aspect of the present disclosure. Shared frequency band 70 includes multiple frames each having guaranteed resources, such as reservation slots 700, 702, 704, 706, 708, 710, 712, 714, and 716, and shared resources, such as COTs 701, 703, 705, 707, 709, 711, 715, and 717, using an NR licensed configuration according to one aspect of the present disclosure. A network shared access server, SAS 71, coordinates the resources by allocating both the resources and assigning priority to each frame. For example, SAS 71 assigns priority to Operator 1 in the frames including reservations slots 700, 704, 708, 712, and 716 and COTs 701, 705, 707, 713, and 717, and assigns priority to Operator 2 in the frames including reservation slots 702, 706, 710, and 714 and COTs 703, 707, 711, and 715. In addition to coordination of resources for transmission of SSB, SI, paging, RACH procedure, it is beneficial also to coordinate the use of SRS and DCI resources (e.g., DMRS and/or CSI-RS ports).

In one example of operation, base station 105a transmit the reservation trigger signal via DCI during reservation slot 700. UE 115a responds with a reservation response signal, SRS, using the coexistence set of SRS resources. As discussed above, UE 115a may be configured for at least two different sets of SRS resources: a sounding set, which may be used for regular sounding reference signals (SRS), and a coexistence set to be used for reservation signals, UE 115a may further be signaled separately to use different transmission powers for either regular SRS or reservation signal SRS. For example, UE 115 (FIG. 12) may execute transmit power control logic 1203, stored in memory 282, to separately control the transmit power of the SRS triggered for transmission, either regular SRS or reservation signal SRS. Base station 105b knows to monitor shared frequency band 70 for the DCI from base station 105a. It also knows which set of SRS resources are the coexistence set and, therefore, may monitor the coexistence set of SRS resources for the reservation signal SRS transmitted by UE 115a.

In NR Release 15, the HARQ timing may be set to K1≤8. This implies a maximum COT, n, of 7 or 8 slots for the assigned priority user. Because the non-assigned priority user may monitor for priority transmissions in the first slot, overhead for such non-assigned priority users may be 1/n slots. Moreover, where two or more operators time division share access to a shared channel, such as shared frequency band 70, HARQ timing for acknowledgements may not support K1 of 0. For example, acknowledgement for transmissions in COT 701 by base station. 105a may not be located in the next slot because base station 105a, as communicating through Operator 1, has opportunistic access in the next slot. Instead, the minimum K1 value would place the acknowledgement of transmissions in COT 701 to the next slot for which Operator 1 has priority, such as the slot containing reservation slot 704 and COT 705. The acknowledgement may either be transmitted in an available slot of COT 705 or may be transmitted in the guaranteed resources of reservation slot 704. Similarly, triggering of SRS may also not support a timing of K2=0, if a different operator has priority in the following slot. As such, SRS triggering may provide the K2 timing for transmission in the next slot for which the operator of the SRS scheduled UE has assigned priority access. In certain instances, while a slot is assigned to the assigned priority user (Operator 1), no communication may occur (e.g., slots 707 and 717), where no data and no control signals are transmitted. Further in such idle slots (slots 707 and 717), the non-assigned priority user (Operator 2) may opportunistically attempt access if data is available for communication.

Figure 8:
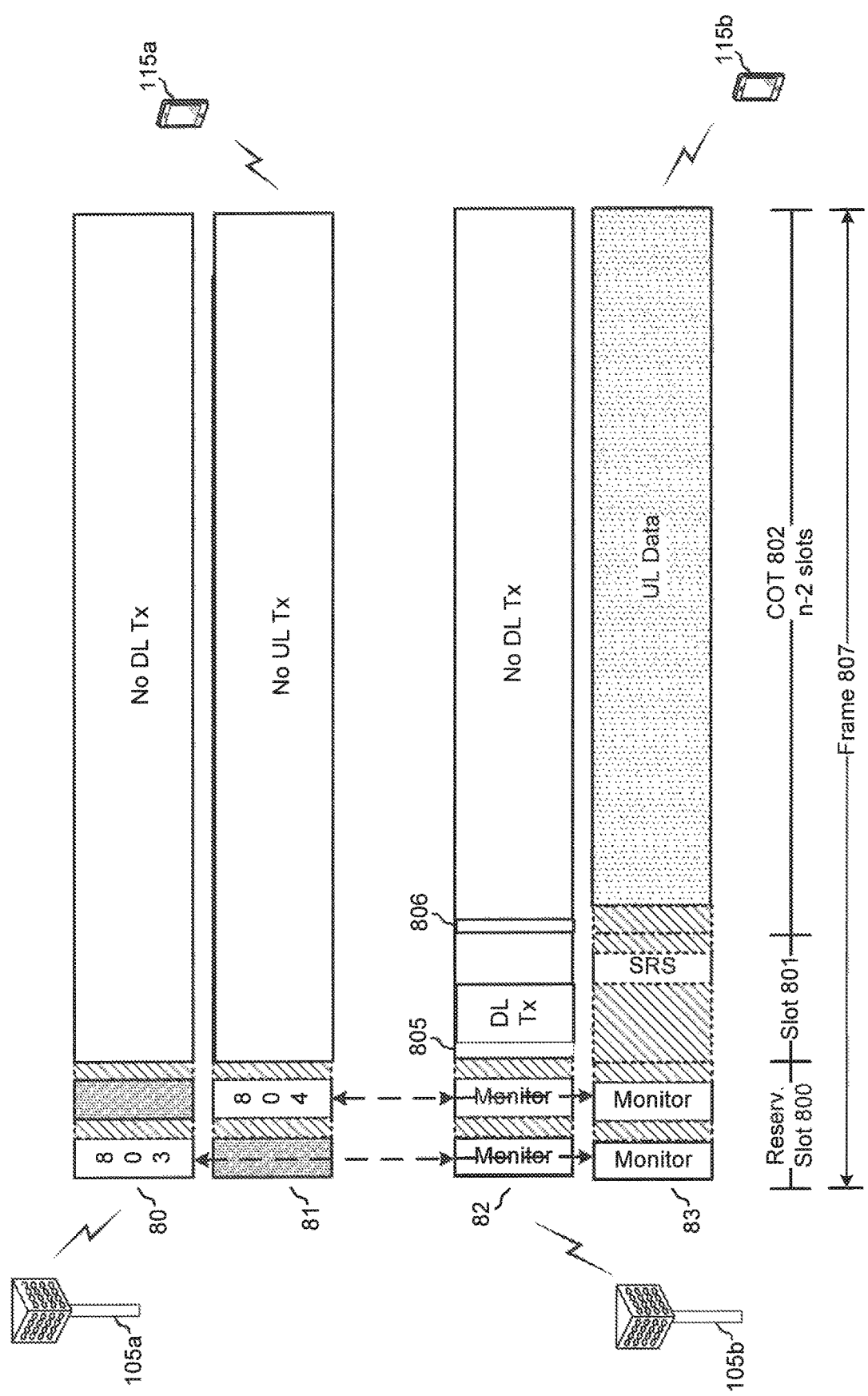
FIG. 8 is a block diagram illustrating shared communication between network entities of two PAL operators, the network entities configured according to one aspect of the present disclosure.

FIG. 8 is a block diagram illustrating shared communication between network entities of two PAL operators, the network entities, base stations 105a-105b and UEs 115a-115b, configured according to one aspect of the present disclosure. Each of communication streams 80-83 is the communication stream as seen by each of the communication pairs of the same frequency resources. According to the illustrated aspect, in order to enable UE 115b, of Operator 2, to transmit on the shared resources, UE 115b may monitor for reservation signals from the other operator(s). Thus, both base station 105b and UE 115b monitor reservation slot 800 for any reservation signals at 803 and 804 in communication streams 80 and 81, respectively, from either of base station 105a and UE 115a, of Operator 1. The configured UEs, such as UE 115b with data for uplink transmission, would monitor reservation signals transmitted in reservation slot 800 from base station 105a or UE 115a. UE 115b monitors for the reservation signals to ensure that its transmission on the shared resources will not negatively impact communications channels of either base station 105a or UE 115a. UE 115b monitors the configured coexistence SRS resource set at 804 if allowed to transmit on the shared resources. In addition, UE 115b would monitor for reservation signals at 803 from base station 105a (e.g., CSI-RS or DMRS from base station 105a).

While Operator 1 has assigned priority to the shared resources, when no reservation signals are detected in reservation slot 800, base station 105b, of Operator 2, can transmit a DCI in a subsequent mini slot, mini slot 805 of slot 801. The DCI at mini slot 805 provides reservation and grant of downlink transmission (DL Tx) of communication stream 82 to UE 115b. Transmission of the DCI by base station 105b at mini slot 805 may also trigger UE 115b, if ready with uplink data, to transmit coexistence SRS in slot 801 of communication link 83. Base station 105b may schedule UE 115b for uplink transmissions in COT 802 with an uplink grant DCI at mini slot 806. For both non-assigned priority network entities to monitor for reservation signals of the assigned priority network entities, the overhead would be 2/n slots for non-assigned priority user uplink transmissions.

The lowest priority users (e.g., GAA users) may also share spectrum resources in the CBRS/3.5 GHz band with PAL users. Such non-exclusive license holders may also be assigned exclusive or guaranteed resources for critical overhead signals and channels in one example aspect, when operating within the 3.5 GHz spectrum, the CBRS shared access servers may coordinate such guaranteed resources for SSBs, SI, paging signals, PRACH resources, and the like, for the GAA users. Relatively small overhead may be used when smaller numbers of operators share the frequency band at any given geographical location. GAA users may provide for possible modes of operation due to flexible configurations for these resources in NR, with coordination of GAA users possible in both the time and frequency domains.

Sharing of resources by each GAA user may be implemented using listen before talk (LBT) NR shared spectrum (SS) procedures. The method of sharing may be similar to the sharing mechanism between PAL users, but the use of LBT techniques allows for more aggressive reuse of resources. GAA users vying for the same shared resources may use pre-coded SRS for interference alignment when possible and/or receiver based messaging or energy-only LBT procedures or synchronization and FBE-like sensing. GAA users from different operators may cause residual interference to each other after the LBT NR SS procedure is performed due to access frequency assignment, timing, and the like. However, when operating within CBRS/3.5 GHz, the potential residual interference may be more effectively minimized by assigning orthogonal resources to the nearby nodes.

Figure 9:
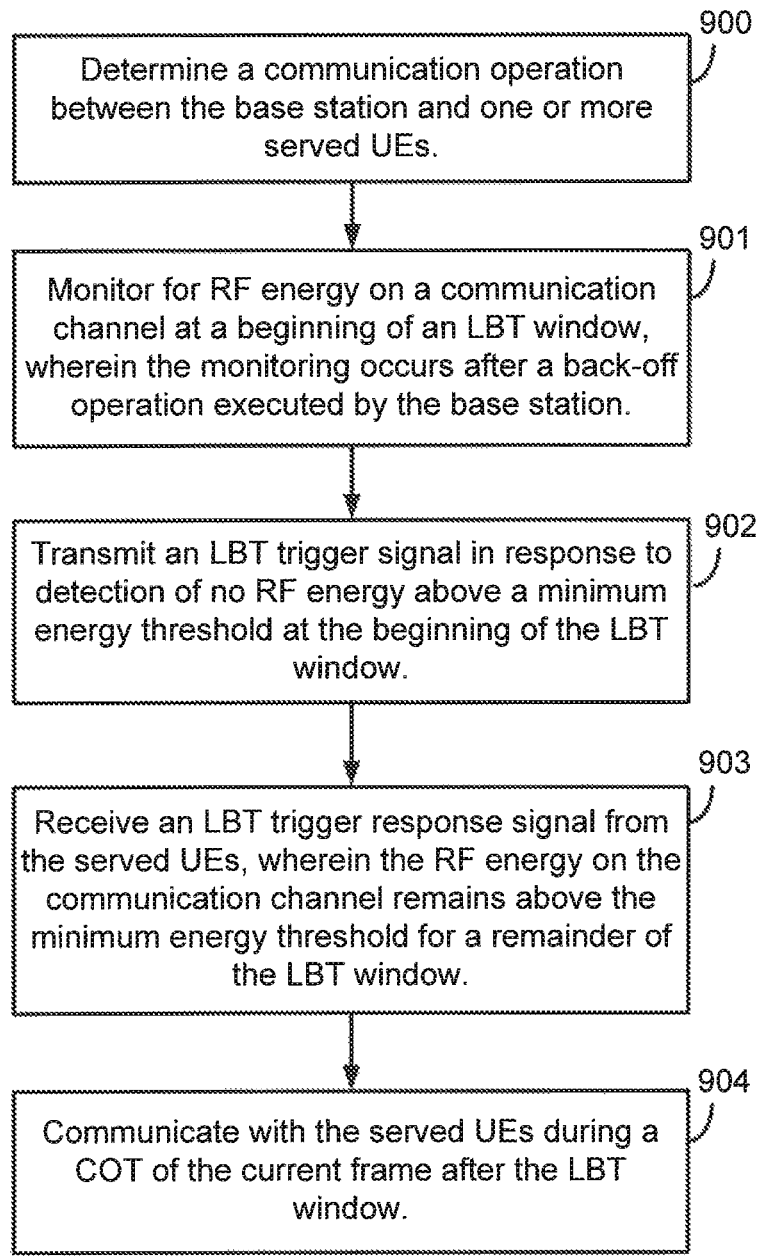
FIG. 9 is a block diagram illustrating example blocks executed to implement one aspect of the present disclosure.
Figure 13:
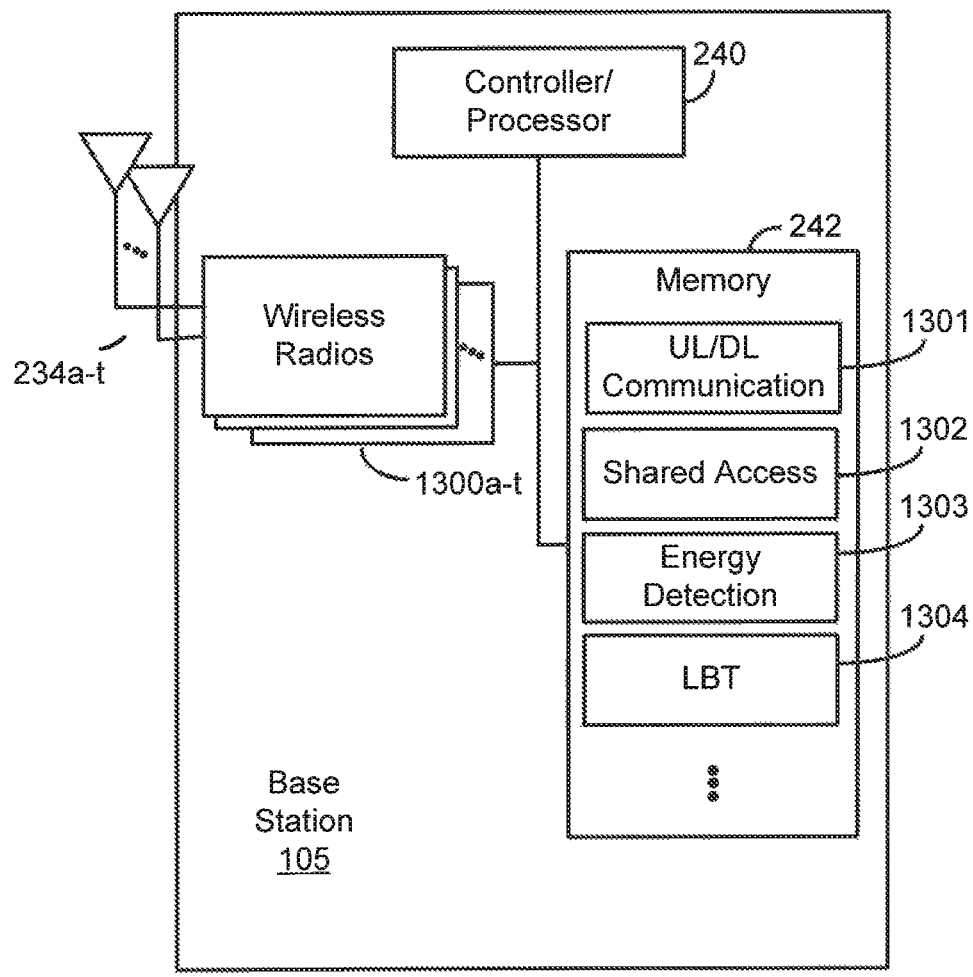
FIG. 13 is a block diagram illustrating a base station configured according to one aspect of the present disclosure.

FIG. 9 is a block diagram illustrating example blocks executed to implement one aspect of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1300a-t and antennas 234a-t. Wireless radios 1300a-t includes various components and hardware, as illustrated in FIG. 2 for base station 105, including modulator/demodulators 232a-t, MIMO detector 236, receive processor 238, transmit processor 220, and TX MIMO processor 230.

At block 900, a base station determines a communication operation between the base station and one or more served UEs. The communication operation may be uplink communication as requested by the UE or downlink communications triggered by receive of data for downlink. For example, a base station, such as base station 105, may determine a communication operation via uplink/downlink communication 1301, in memory 242. Uplink/downlink communication 1301 may include a downlink buffer that indicates downlink data for transmission to one of the served UEs, or may include scheduling logic for response to a scheduling request from a served UE to schedule and grant uplink communication. Base station 105, under control of controller/processor 240, executes shared access logic 1302, in memory 242. The execution environment of shared access logic 1302 provides for base station 105 to compete for access to the shared communication channel.

At block 901, the base station monitors for radio frequency (RF) energy on a communication channel at a beginning of an LBT window of a current frame in a shared spectrum shared between at least one or more opportunistic general authorized users, wherein the monitoring occurs after a back-off operation executed by the base station. In an energy-based LBT procedure according to the aspects of the present disclosure, base station 105 monitors the shared resources for RF energy above a minimum threshold value. If such energy is detected above the threshold, base station 105 would conclude that the channel is occupied and begin the LBT procedure again. To monitor for RF energy, within the execution environment of shared access logic 1302, base station 105 receives RF energy via antennas 234a-t and wireless radios 1300. Base station 105 may execute energy detection logic 1303, stored in memory 242. The execution environment of energy detection logic 1303 provides measurement parameters for determining the threshold level of energy between where the shared channel is considered occupied and the channel is considered available.

At block 902, the base station transmits an LBT trigger signal in response to detection of no RF energy above a minimum energy threshold at the beginning of the LBT window. When no RF energy is detected above the minimum threshold as identified within the execution environment of energy detection logic 1303, base station 105, executes, under control of controller/processor 240, LBT procedure 1304, in memory 242. The execution environment of LBT procedure 1304 provides for managing access to the shared channel using LBT. For example, base station 105, within the execution environment of LBT procedure 1304, transmits an LBT trigger signal via wireless radios 1300a-t and antennas 234a-t, to a served UE, not only to trigger the served UE to send a channel reservation response signal, but to indicate to competing neighbors that the channel is intended to be occupied.

At block 903, the base station receives an LBT trigger response signal from the one or more served UEs, wherein the RF energy on the communication channel remains above the minimum energy threshold for a remainder of the LBT window. After base station 105 transmits the trigger signal, the served UE responds with a trigger response signal which also acts as a channel reservation signal on the shared resources. Base station 105 receive the trigger response signal via antennas 234a-t and wireless radios 1300a-t. RF blocking energy may be transmitted onto the shared resources through blocking signals transmitted either by base station 105, within the execution environment of LBT procedure 1304, the served UE, or both, until the end of the LBT window. The blocking signals would be detected by most other competing neighbor nodes attempting access to the channel during their respective LBT procedures and preserves reservation of the shared channel to base station 105 and its served UEs.

At block 904, the base station participates in communication with the one or more UEs during a channel occupancy time (COT) of the current frame after the LBT window. After winning the channel in the LBT window, communications between base station 105 and the served UE, whether uplink, downlink, or both, may begin in the COT portion of the current frame.

Figure 10:
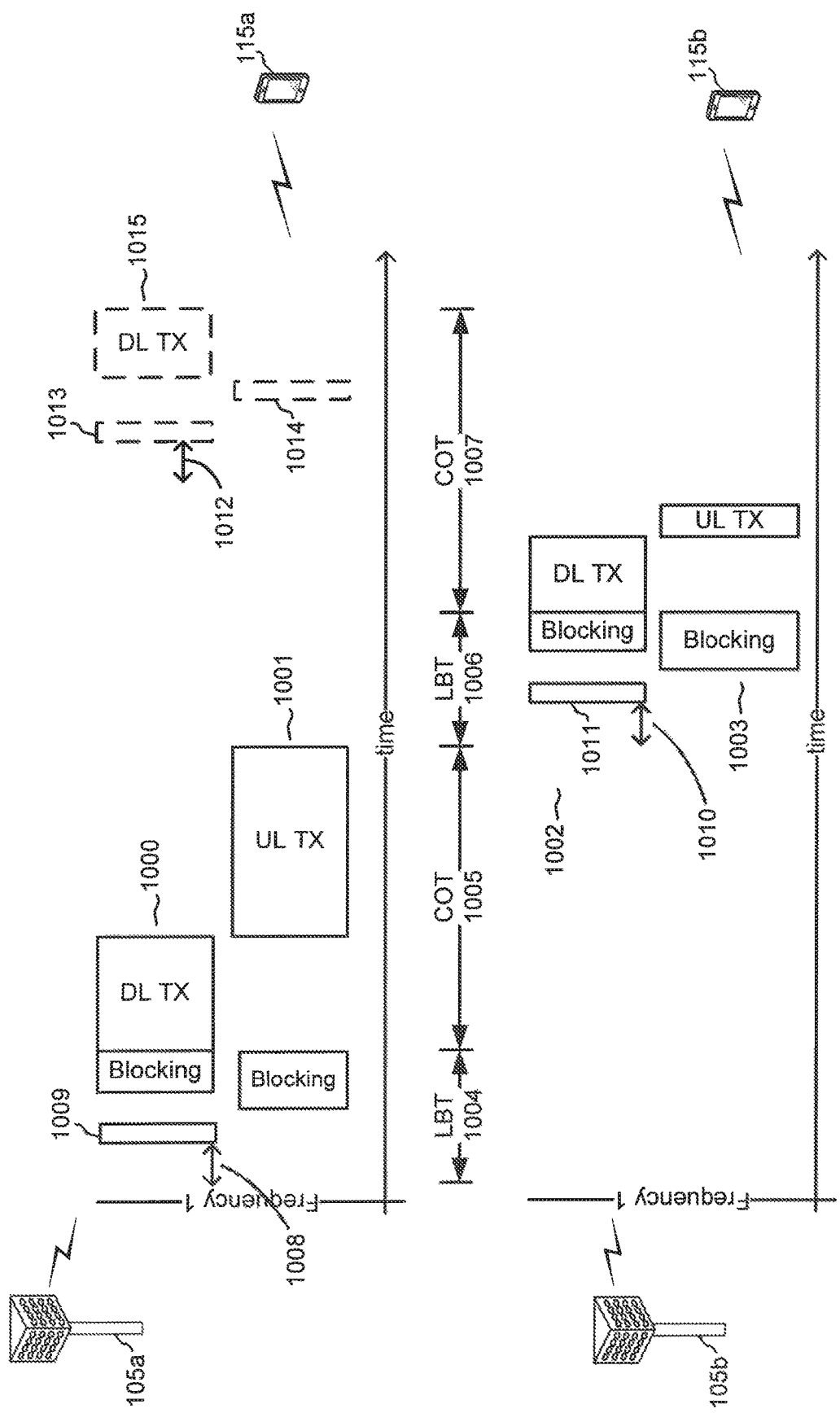
FIG. 10 is a block diagram illustrating GAA users of Operator 1, and of Operator 2, each configured according to one aspect of the present disclosure and sharing access to a 3.5 GHz band communication network.

FIG. 10 is a block diagram illustrating GAA users, including base station 105a and UP 115a, of Operator 1, and base station 105b and UE 115b, of Operator 2, each configured according to one aspect of the present disclosure and sharing access to a 3.5 GHz band communication network. Each of base stations 105a and 105b compete for access to the shared frequency band, frequency 1. At LBT slot 1004 base station 105a executes a pseudo random back off 1008, which can be coordinated among operators though the CBRS shared access server or may be completely random and generated at base station 105a. After pseudo random back off 1008, base station 105a transmits a trigger signal 1009 in communication stream 1000. UP 115a responds with a channel reservation response signal, blocking, in communication stream 1001. The trigger response delay may be minimized in order to minimize the likelihood of collisions.

According to aspects of the present disclosure, the LBT procedure used by GAA users competing for access to the shared resources is an energy-based LBT. Thus, during pseudo random back off 1008, base station 105a monitors for RF energy on frequency 1. If RF energy is detected above a minimum threshold value, base station 105a would not transmit trigger signal 1009, and, instead, would execute another pseudo random back off (not shown). However, as illustrated, base station 105a does not detect RF energy above the minimum threshold value during pseudo random back off 1008.

In order to prevent other GAA users from gaining access to the shared frequency band, channel blocking may be used by either base station 105a, UE 115a, or both. Base station 105a and/or UE 115a may block the channel of frequency 1 by continuously transmitting a signal (e.g., blocking signal, channel reservation response signal, etc.) until the end of LBT slot 1004. The transmitter (base station 105a) can block the medium after detecting the response, blocking, from the receiver (UE 115a) in order to protect reception of the acknowledgement. Thus, if base station 105b would attempt access to frequency 1 during LBT slot 1004, it would listen and measure the RF energy of the blocking signals transmitted by either or both of base station 105a or UE 115a. After securing the channel in LBT slot 1004, base station 105a may make any downlink transmissions in communication stream 1000 during COT 1005 on frequency 1 and UE 115a may make any uplink transmissions in communication stream 1001 during COT 1005 on frequency 1.

Energy-based LBT allows channel blocking of two nodes using different frequency resources as there may be leakage of energy into an adjacent band. However, receiver blocking may be technology specific and optional, depending on whether overhead minimization is of primary concern.

At LBT slot 1006, base station 105b, of Operator 2, may attempt to access the shared frequency band, frequency 1, after executing pseudo random back off 1010. Base station 105b transmits trigger signal 1011 in communication stream 1002, while UE 115b responds with channel reservation response signal, blocking, in communication stream 1003. Either one or both of transmitter or receiver blocking signals by either or both of base station 105b or UE 115b secure the channel of frequency 1 with RF energy above the minimum threshold value for the duration of LBT slot 1006. Once the channel is secured in LBT slot 1006, base station 105b and UE 115b can participate in communications (e.g., downlink and/or uplink transmissions) during COT 1007.

It should be noted that inter-technology coexistence may be facilitated; however, such coexistence would be possible by synchronizing the LBT windows of each technology node.

Access outside the synchronized contention (LBT) windows can be allowed if the LBT window of the transmitting node was synchronized prior to access and the transmitting node finds the COT empty. Referring back to FIG. 10, when new data arrives at base station 105a in the middle of COT 1007, where all transmissions by either of base station 105b or UE 115b have ended in COT 1007, base station 105a performs the energy-based LBT procedure beginning with pseudo random back off 1012, followed by trigger signal 1013. UE 115a responds by transmitting channel reservation response signal 1014, after which base station 105a may begin its downlink transmission 1015. However, regardless of the amount of data that base station 105a has to transmit, the opportunistic downlink transmission 1015 would stop at the end of COT 1007. Base station 105a may begin a new energy-based contention procedure at the next synchronized LBT window.

It should be noted that, when the nodes from different operators competing for the same shared frequency spectrum are not synchronized, receiver protection through blocking signals may not be enabled.

Figure 11:
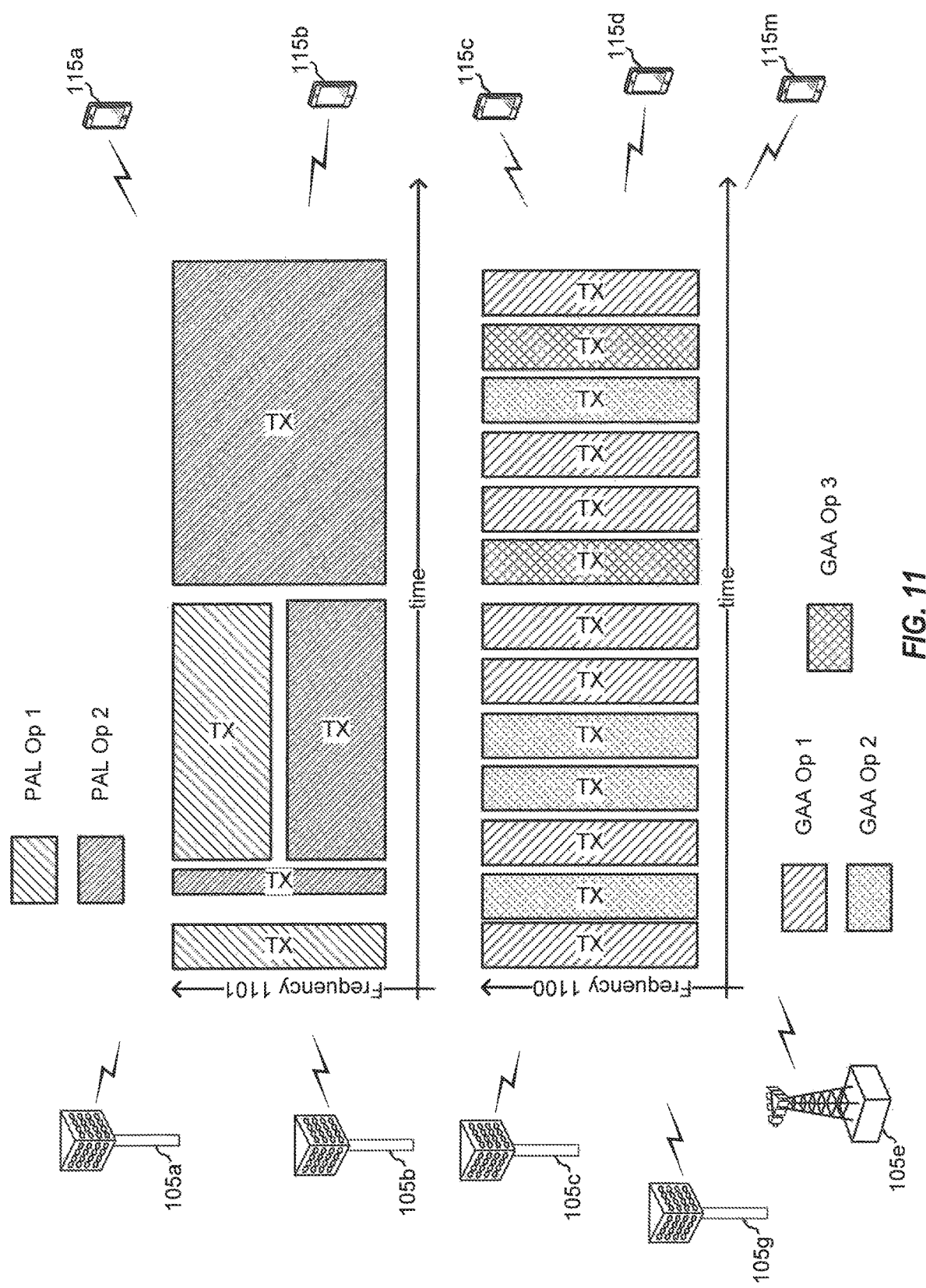
FIG. 11 is a block diagram illustrating a sharing scheme for sharing frequency spectrum between multiple PAL users and multiple GAA users, each configured according to aspects of the present disclosure.

FIG. 11 is a block diagram illustrating a sharing scheme for sharing frequency spectrum between multiple PAL users, base stations 105a-105b and UEs 115a-115b, and multiple GAA users, base stations 105c, 105g, 105e, and UEs 115c, 115d, and 115m each configured according to aspects of the present disclosure. According to the illustrated aspect of the present disclosure the assigned bandwidth for sharing may be divided into two bandwidth partitions, frequency 1100 and frequency 1101. Each of frequency 1100 and 1101 may employ time division multiplex (TDM), frequency division multiplex (FDM), a combination of TDM and FDM, and the like. The PAL users, base stations 105a-105b and UEs 115a-115b, use the listen-based sharing mechanisms, as illustrated and described with respect to FIGS. 5-8 in order to manage access to frequency 1101, while GAA users, base stations 105c, 105g, 105e, and UEs 115c, 115d, and 115m, use the energy-based LBT NR SS sharing mechanism, as illustrated and described with respect to FIGS. 9-10 in order to manage access to frequency 1100. As illustrated, frequency 1100 provides TDM access, while frequency 1101 provides a combination of TDM and FDM. Because the shared frequency resources have been divided into two different bandwidth parts, there is sufficient frequency separately for both sets of users to compete and access the shared resources, while protecting critical signaling, such as SSB, SI, paging, and MACH resources, with guaranteed resource allocations for both PAL and GAA users.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    obtaining, by a user equipment (UE), a resource configuration, wherein the resource configuration identifies a plurality of sound reference signal (SRS) resources including at least a sounding set of SRS resources and a coexistence set of SRS resources;
    receiving, by the UE, a trigger signal from a serving base station over a shared spectrum shared between at least one or more priority license users;
    transmitting, by the UE in response to the trigger signal, an SRS using the coexistence set of SRS resources; and
    communicating, by the UE, with the serving base station.

2. The method of claim 1, wherein the SRS is transmitted during a reservation slot of a current frame of the shared spectrum, wherein the reservation slot is associated with a priority access to the shared spectrum.

3. The method of claim 1, wherein the trigger signal includes a communication grant that defines the communication with the serving base station.

4. The method of claim 1, further including:
    monitoring, by the UE without priority access to the shared spectrum, for one or more reservation signals transmitted during a reservation slot of a current frame of the shared spectrum by one or more network entities of a network operator having a priority access to the shared spectrum for the current frame, wherein the transmitting the SRS and the participating in communication occurs in one or more subsequent slots of the current frame in response to a failure to detect the one or more reservation signals.

5. The method of claim 4, wherein the one or more reservation signals includes one or more of:
    a sounding signal transmitted using the coexistence set of SRS resources by one or more neighboring UEs of the network operator; and
    a reference signal transmitted by one or more neighboring base stations of the network operator.

6. The method of claim 1, further including:
receiving, by the UE, a plurality of transmission power control messages including at least a sounding power control for transmission of a sounding signal using the sounding set of SRS resources and a coexistence power control for transmission of a coexistence signal using the coexistence set of SRS resources, wherein the SRS is transmitted according to the coexistence power control.

7. The method of claim 1, wherein a first portion of the shared spectrum shared between the at least one or more priority license users is bandwidth partitioned from a second portion of the shared spectrum shared by one or more opportunistic general authorized users.

8. An apparatus configured for wireless communication, the apparatus comprising:
at least one processor; and
a memory coupled to the at least one processor,
wherein the at least one processor is configured:
to obtain, by a user equipment (UE), a resource configuration, wherein the resource configuration identifies a plurality of sound reference signal (SRS) resources including at least a sounding set of SRS resources and a coexistence set of SRS resources;
to receive, by the UE, a trigger signal from a serving base station over a shared spectrum shared between at least one or more priority license users;
to transmit, by the UE in response to the trigger signal, an SRS using the coexistence set of SRS resources; and
to communicate, by the UE, with the serving base station.

9. The apparatus of claim 8, wherein the SRS is transmitted during a reservation slot of a current frame of the shared spectrum, wherein the reservation slot is associated with a priority access to the shared spectrum.

10. The apparatus of claim 8, wherein the trigger signal includes a communication grant that defines the communication with the serving base station.

11. The apparatus of claim 8, further including configuration of the at least one processor to monitor, by the UE without priority access to the shared spectrum, for one or more reservation signals transmitted during a reservation slot of a current frame of the shared spectrum by one or more network entities of a network operator having a priority access to the shared spectrum for the current frame, wherein the configuration to transmit the SRS and the configuration to participate in communication occurs in one or more subsequent slots of the current frame in response to a failure to detect the one or more reservation signals.

12. The apparatus of claim 11, wherein the one or more reservation signals includes one or more of:
a sounding signal transmitted using the coexistence set of SRS resources by one or more neighboring UEs of the network operator; and
a reference signal transmitted by one or more neighboring base stations of the network operator.

13. The apparatus of claim 8, further including configuration of the at least one processor to receive, by the UE, a plurality of transmission power control messages including at least a sounding power control for transmission of a sounding signal using the sounding set of SRS resources and a coexistence power control for transmission of a coexistence signal using the coexistence set of SRS resources, wherein the SRS is transmitted according to the coexistence power control.

14. The apparatus of claim 8, wherein a first portion of the shared spectrum shared between the at least one or more priority license users is bandwidth partitioned from a second portion of the shared spectrum shared by one or more opportunistic general authorized users.

* * * * *